Sept. 25, 1962   A. P. MOORE   3,055,386
LEVEL CONTROL VALVE
Filed Oct. 20, 1959
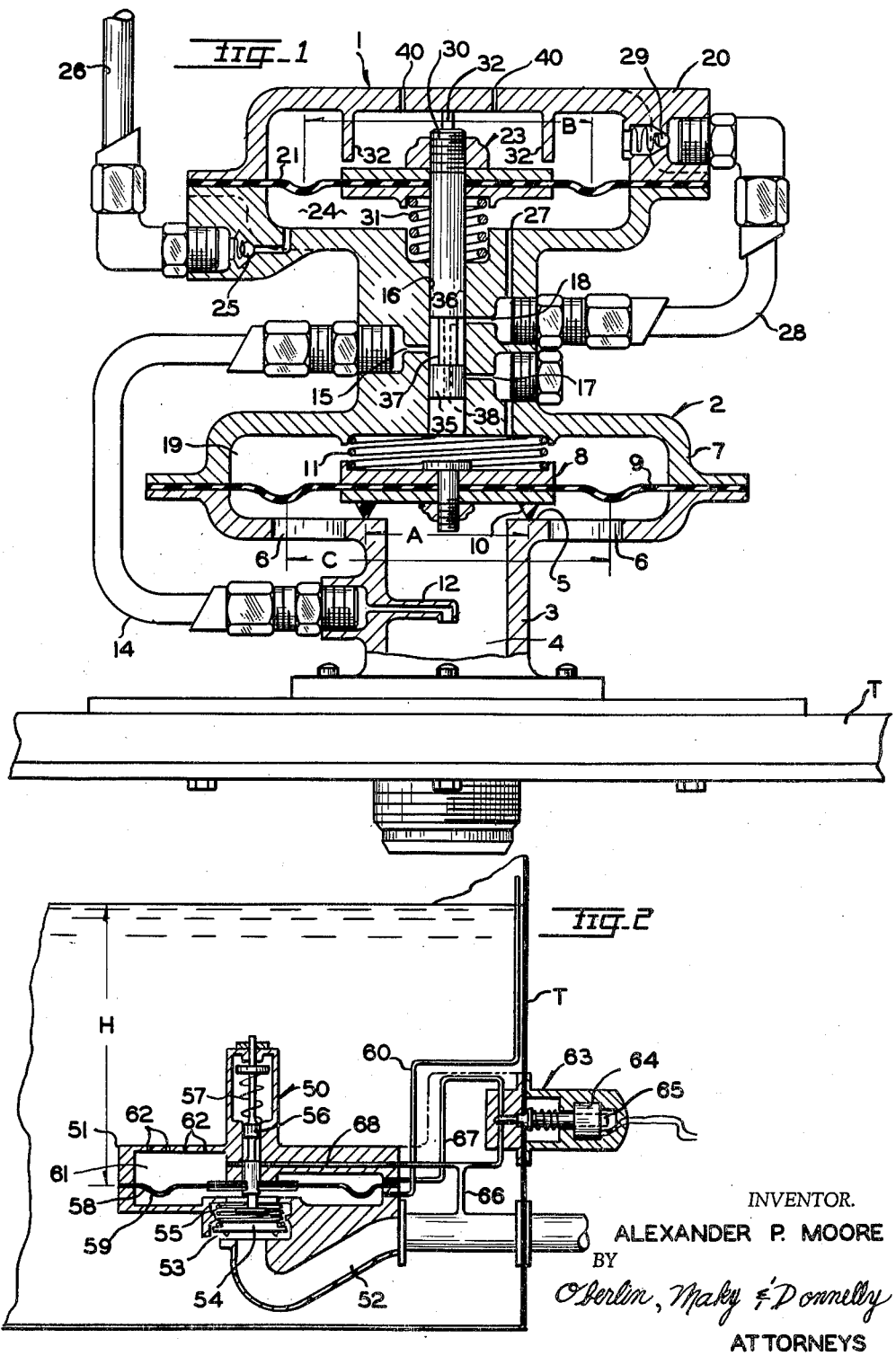
INVENTOR.
ALEXANDER P. MOORE
BY
Oberlin, Maky & Donnelly
ATTORNEYS 3,055,386
LEVEL CONTROL VALVE
Alexander P. Moore, Bethpage, N.Y., assignor to Parker-Hannifin Corporation, Cleveland, Ohio, a corporation of Ohio
Filed Oct. 20, 1959, Ser. No. 847,479
11 Claims. (Cl. 137—403)

The present invention relates generally as indicated to a level control valve and more particularly to a level control valve which, when installed at or adjacent to the filler opening of a tank, is operative to automatically shut off the flow of the incoming liquid into the tank in response to the static head or the weight of the liquid in the tank. Accordingly, the valve herein may appropriately be called a "gravimetric level control valve."

In recent years there has been considerable activity in the design of fuel shut-off or level control valves for aircraft and the like that are mounted at, or near, the bottom of the tank, whereby, in the case of an aircraft wing tank for example, it is a great convenience to be able to fill the tank by connection of a fuel supply nozzle to an opening in the bottom of the tank, whereby it is unnecessary for anyone to climb upon and walk on the wing structure. However, such level control valves generally employ a float which, when buoyed up by the rising fuel level in the tank, operates a pilot valve which, in turn, shuts off the main valve near the bottom of the tank whenever the fuel or liquid level reaches a level sufficient to so actuate the float. Accordingly, this type of float-pilot construction is what may be referred to as a "volumetric" type of level control because the tank will be filled to a prescribed level (and thus volume) irrespective of the density of the liquid.

In the case of aircraft and the like, it is a customary practice to compute the flying range thereof on the basis of lbs./hr. fuel consumption whereby it is more important to fill the tank with a prescribed number of pounds of fuel, rather than gallons especially since there are some differences in densities of commonly used fuels. Therefore the instant valve, being of the gravimetric type, responds to filling of the tank to that level which produces a predetermined static head of fuel in the tank as required to initiate automatic shut-off of the valve, this arrangement taking into account the difference in density of one fuel from another. In other words, the tank will be filled to a higher level with the low density fuel than with a higher density fuel but, in any case, the total weight of fuel in the tank is the same. Similarly, in connection with filling of tanks with numerous liquids other than fuel such as milk, chemicals, slurries etc. it is a prevalent practice to refer to quantities thereof in terms of weight rather than volume.

Accordingly, it is one principal object of this invention to provide a level control valve which automatically shuts off the flow of incoming liquid whenever the static head of the liquid in the tank being filled reaches a predetermined value.

It is another object of this invention to provide a valve assembly of the character indicated in which the operation of the main inlet valve is under the control of a static head responsive control valve of the diaphragm type including a vented chamber which permits movement of the valve member thereof under the influence of a predetermined static head of the liquid introduced into the tank to a position thereby to effect movement of the inlet valve to a closed position blocking the flow of additional liquid into the tank.

It is another object of this invention to provide in a valve assembly of the character indicated, an independently operable valve or so-called "pre-check valve" which, when actuated, allows a buildup of pressure on the head responsive valve from the main supply line to check the operation thereof in shutting off the main inlet valve before commencing the tank filling operation.

It is another object of this invention to provide a valve assembly of the character indicated which is of simple, light-weight form and which is economical to manufacture.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIGS. 1 and 2 are central vertical cross-section views of two valve assemblies embodying the present invention.

As shown in the drawing, the valve assembly 1 comprises a multi-part housing 2, the base part 3 of which is adapted to be mounted as in the bottom of a tank T, and is provided with an inlet port 4, a valve seat 5, and a series of outlet ports 6.

Secured to the base part 3 is the intermediate housing part 7, a diaphragm valve assembly 8 having the peripheral portion of its laterally flexible diaphragm 9 clamped between said base and intermediate parts 3 and 7. The valve 8 constitutes the main inlet valve which has a sealing ring 10 adapted to engage the valve seat 5 under the influence of the biasing spring 11 which is compressed between the intermediate housing part 7 and the central portion of the main inlet valve 8.

Extending into the inlet port 4 is the pressure pickup or Pitot tube 12 which, by way of the conduit 14 and opening 15 in the intermediate housing part 7, leads to slide valve bore 16. Also intersecting the slide valve bore are the openings 17, and 18, of which opening 17 leads to a pressure seating chamber 19 defined between the inlet valve 8 and the intermediate housing part 7.

The housing assembly 2 also includes a cap part 20 which serves to clamp the peripheral portion of the diaphragm 21 of a slide valve assembly 23 and to form therewith a chamber 24 which may be vented to the atmosphere or into the space at the top of the tank by way of the check valve 25 and upwardly extending conduit 26.

The aforesaid opening 18 which leads to the slide valve bore 16 has one branch 27 leading into the vented chamber 24 and a conduit 28 leading by way of the check valve 29 to the space above the diaphragm 21. The slide valve member 30 is urged upwardly, by means of the spring 31 compressed between the intermediate part 7 and said slide valve assembly 23, against the positioning stops 32 of the cap part 20.

The slide valve member 30 has a pair of lands 35 and 36 slidably fitted in the slide valve bore 16 and an intervening groove 37, and in the position shown, the opening 17 is blocked by the land 35, whereby the pressure seating chamber 19 associated with the main inlet valve 8 is vented by way of the passage 38 in the slide valve member 30 which registers with the opening 18.

Now, assuming that a source of liquid pressure is connected to the inlet port 4, the pressure head, acting on the area of diameter A of seat 5, will force the main inlet valve 8 upwardly out of engagement with the seat 5 by overcoming the biasing effect of the spring 11, whereby the liquid will flow into the tank T from the inlet 4 and through the outlet ports 6.

When the static head of the liquid introduced into the tank reaches a predetermined value, it will, in acting on the effective area of diameter B of the diaphragm of the slide valve assembly 23, force the latter downwardly against the upward opposing force of the spring 31. When that occurs, the opening 15 in the slide valve bore 16 will be communicated with the opening 17 that leads into the pressure seating chamber 19 and the vent port 38 of the slide valve 30 is cut off from the opening 18. Accordingly, liquid under pressure in the inlet port 4, will now be conducted into the pressure seating chamber 19, and since the pressure in the seating chamber acts on an effective area of diameter C of the main inlet valve 8 which is larger than that exposed to the inlet pressure, the main inlet valve 8 will be forced to seated position with the assistance of the spring 11. Therefore, even though the pressure source remains connected with the inlet port 4, no additional liquid can flow into the tank T.

It will be evident from the foregoing that the instant valve assembly is automatically closed in response to the static head of the liquid introduced into the tank reaching a predetermined value and, therefore, a predetermined number of pounds of liquid will be introduced into the tank regardless of a variation in density, provided, of course, that the tank has sufficient depth to accommodate a predetermined number of pounds of liquid of least density. As aforesaid, in the case of aircraft, for example, different fuels may have slightly different densities and since the range of an aircraft is generally specified in relation to pounds of fuel, or fuel consumption in lbs./hr., the present valve assembly 1 assures that the required number of pounds of fuel will be supplied into the tank T thereof regardless of such variation in density.

In order to make the diaphragm 21 of the valve assembly 23 responsive only to the static head above the diaphragm there are provided the branch passage 27 and conduit 28 so that pressure fluctuations in passage 18 act on both sides of diaphragm 21, the opening or openings 40 in cap part 20 being of sufficiently small size as to maintain substantially the same fluid pressure in the chamber above diaphragm 21 and in the chamber 24 except for the progressively increasing head of fluid in the tank T. If either 27 or 28 were omitted, the diaphragm 21 would be subject to pressure from the pickup 12 acting on only one side of the diaphragm 21, thereby interfering with its proper functioning.

Referring now to FIG. 2, the valve assembly 50 therein comprises a multi-part casing 51 formed with an inlet port 52, an outlet port 53, and a main inlet valve 54 acted on by spring 55 tending to move said valve 54 to seated position closing communication between ports 52 and 53. The casing 51 is adapted for mounting on a tank T.

As in FIG. 1 there is a spool valve assembly 56 urged to the position shown by spring 57, said spool valve assembly 56 including a diaphragm 58 which forms with casing 51 a chamber 59 vented by line 60 and a static head chamber 61 to which the head of fluid progressively increasing in tank T has access by way of openings 62.

Associated with the valve assembly 50 is a pre-check valve 63, herein shown as a solenoid-operated valve by way of example, which when the solenoid 64 thereof is energized to unseat valve member 65 fluid under pressure in the inlet port 52 flows through conduits 66 and 67 into chamber 61 to build up pressure therein acting on the top of diaphragm 58 faster than the fluid can escape through openings 62. Such pressure forces spool valve 56 down to close the main inlet valve 54. Thus, by operating the pre-check valve 63 it is possible to initially check the condition of the valve assembly 50 as a whole to make sure that the diaphragm 58 is not ruptured, that the spool valve 56 is not stuck, or that the main inlet valve 54 is not stuck in open position. As apparent, a similar pre-check valve 63 may be used in connection with the FIG. 1 valve assembly to build up fluid pressure in the chamber above diaphragm 21 to force the spool valve 30 downward and thus close the main inlet valve 8.

In normal operation of the FIG. 2 valve assembly 50 a fluid supply line is connected to the inlet port 52, thus causing the main inlet valve 54 to be unseated to permit flow of fluid into the tank T. It is to be noted that the passage 68 to conduit 66 is blocked by spool valve 56 and the pre-check valve 63 also is closed. When the tank T has been filled to predetermined amount, the static head H thereof which acts on the top of diaphragm 58 moves the spool valve 56 down (against the biasing influence of adjustable spring 57) to force the main inlet valve 54 to seated position. As spool valve 56 moves down it uncovers passage 68 which permits pressure fluid from passage 66 and inlet port 52 to flow into chamber 61. This further pressurizes the upper side of diaphragm 58 for positive closing of valve 54 since pressure fluid can enter chamber 61 faster through passages 66 and 68 than it can escape through restricted openings 62.

Although reference is herein made to filling of fuel tanks for aircraft, it is to be understood that the valves herein may be employed for pressure fueling of liquid-propelled missiles and rockets, utilizing the height of the missile to advantage. The valves also have use in commercial and military marine applications, including cargo; in railroad locomotive and tank car applications for all liquids as well as fuel; in freighter truck applications carrying liquid cargo; in fuel and chemical tanks in the chemical industry; in military fuel tankers and oilers and submarines; in oil storage tanks in oil fields; in storage of slurries or liquids with entrained solids; and in general, in any application where a liquid is stored in a tank.

Other modes of applying the principle of the invention may be employed, change being made as regards the details described, provided the features stated in any of the following claims, or the equivalent of such, be employed.

I therefore particularly point out and distinctly claim as my invention:

1. A valve assembly for filling a tank to predetermined depth in relation to the density of a given liquid comprising a housing having an inlet port, an inlet valve seat, and an outlet port; an inlet valve member movable in said housing into and out of engagement with said seat to close and open said valve; said inlet valve member, when in closed position, having one side thereof exposed to said inlet port whereby liquid under pressure in said inlet port acting on such one side tends to move said inlet valve member to open position, said inlet valve member and housing defining a first chamber to which the opposite side of said inlet valve member, of area larger than such one side, is exposed to liquid under pressure in said inlet port by way of a first passage leading from said inlet port to said first chamber; a static head responsive valve in said housing operative, in one position when the static head of the liquid in the tank is less than desired, to vent said first chamber whereby liquid under pressure in said inlet port acting on such one side of said inlet valve member moves the latter to open position, and further operative, in another position, when acted upon by a predetermined static head of liquid thereon on one side, to close the vent of said first chamber whereby liquid pressure builds up in said first chamber to move said inlet valve member to closed position; said static head responsive valve and said housing defining second and third chambers on opposite sides of said static head responsive valve respectively; and means defining a pressure equalization passage leading from said first passage to said second and third chambers and thence into such tank above the level to which the tank is to be filled whereby back pressure in such pressure equalization passage is substantially balanced out in said second and third chambers so that said static head responsive valve is responsive only to the static head of the liquid in the tank acting on such one side thereof.

2. The valve assembly of claim 1 wherein said static head responsive valve is operative in said another position to open communication between said first passage and said first chamber.

3. The valve assembly of claim 1 wherein such opposite side of said inlet valve member is constituted by a laterally flexible diaphragm that has its peripheral portion secured to said housing.

4. The valve assembly of claim 1 wherein said static head responsive valve comprises a valve member movable in said housing and having an extended area of such one side thereof acted upon by the static head of liquid in the tank to move it from said one position to said another position.

5. The valve assembly of claim 4 wherein said extended area is constituted by a laterally flexible diaphragm that has its peripheral portion secured to said housing, said housing and diaphragm forming said third chamber vented on the other side of said diaphragm.

6. The valve assembly of claim 1 wherein the second chamber on such one side of said static head responsive valve has restricted communication with the liquid in the tank.

7. The valve assembly of claim 6 wherein such pressure equalization passage is provided with a check valve to permit flow of liquid into the second chamber on such one side of said static head responsive valve.

8. The valve assembly of claim 6 wherein such pressure equalization passage is provided with a check valve to permit flow of liquid from the third chamber on the other side of said static head responsive valve.

9. The valve assembly of claim 6 wherein such pressure equalization passage is provided with a pair of check valves respectively permitting flow of liquid into the second chamber on one side of said static head responsive valve and to permit flow of liquid from the third chamber on the other side of said static head responsive valve.

10. A valve assembly for filling a tank to predetermined depth in relation to the density of a given liquid comprising a housing having an inlet port, an inlet valve seat, and an outlet port; an inlet valve member movable in said housing into and out of engagement with said seat to close and open said inlet valve; said inlet valve member, when in closed position, having one side thereof exposed to said inlet port whereby liquid under pressure in said inlet port acting on such one side tends to move said inlet valve member to open position; said inlet valve member and housing defining a first chamber to which the opposite side of said inlet valve member, of area larger than such one side, is exposed to liquid under pressure in said inlet port by way of a first passage leading from said inlet port to said first chamber; and a static head responsive valve in said housing operative, when acted upon by a predetermined static head of liquid thereon on one side, to open communication between said first passage and said first chamber whereby liquid pressure builds up in said first chamber to move said inlet valve member to closed position; said static head responsive valve further being operative, when acted upon by a lesser static head of liquid than aforesaid, to open communication between said first passage and a pressure equalization passage having communication with both sides of said static head responsive valve.

11. In combination, a tank having a predetermined gravimetric capacity of a given liquid with which it is desired to fill the tank; a fluid pressure-actuated valve assembly associated with said tank through which such liquid flows into said tank; and a control valve acted upon by the static head of the liquid in said tank as the level of the liquid rises in said tank and operatively connected with said pressure-actuated valve to close the latter upon such static head attaining a predetermined value; said fluid pressure-actuated valve assembly comprising a housing having an inlet port, an inlet valve seat, and an outlet port; an inlet valve member movable in said housing into and out of engagement with said seat to close and open said inlet valve assembly; said housing and inlet valve member forming a pressure-seating chamber of larger effective area than said seat; first passage means from said inlet port to said control valve assembly, said control valve assembly having means which in a first position define a pressure equalization passage from said first passage and said pressure-seating chamber to the opposite vented sides of said control valve, and in a second position define a chamber pressure passage between said first passage and said pressure seating chamber wherein liquid pressure building up in said chamber will urge said inlet valve member to close said inlet valve assembly, whereby said positions correspond to whether the static head acting on one side of said control valve is less than or equal to said predetermined value.

References Cited in the file of this patent
UNITED STATES PATENTS

| | | |
|---|---|---|
| 1,930,033 | Apple | Oct. 10, 1933 |
| 2,471,328 | Jones | May 24, 1949 |
| 2,620,818 | Symmons | Dec. 9, 1952 |
| 2,712,828 | Badger | July 12, 1955 |
| 2,803,263 | Kenney | Aug. 20, 1957 |
| 2,871,873 | McQueen | Feb. 3, 1959 |